(12) United States Patent
Kato et al.

(10) Patent No.: US 11,161,227 B2
(45) Date of Patent: Nov. 2, 2021

(54) ELECTRIC WORKING MACHINE AND METHOD FOR CONTROLLING MOTOR OF ELECTRIC WORKING MACHINE

(71) Applicant: MAKITA CORPORATION, Anjo (JP)

(72) Inventors: Itsuku Kato, Anjo (JP); Akira Tomonaga, Anjo (JP); Katsuna Hayashi, Anjo (JP); Tokuo Hirabayashi, Anjo (JP); Tomoyuki Kondo, Anjo (JP)

(73) Assignee: MAKITA CORPORATION, Anjo (JP)

( * ) Notice: Subject to any disclaimer, the term of this patent is extended or adjusted under 35 U.S.C. 154(b) by 197 days.

(21) Appl. No.: 16/157,492

(22) Filed: Oct. 11, 2018

(65) Prior Publication Data

US 2019/0111551 A1 Apr. 18, 2019

(30) Foreign Application Priority Data

Oct. 17, 2017 (JP) .............................. JP2017-201059

(51) Int. Cl.
| | | |
|---|---|---|
| *B25B 21/02* | (2006.01) | |
| *B25F 5/00* | (2006.01) | |
| *H02P 6/17* | (2016.01) | |
| *B25D 11/04* | (2006.01) | |

(52) U.S. Cl.
CPC .............. *B25B 21/02* (2013.01); *B25D 11/04* (2013.01); *B25F 5/00* (2013.01); *B25F 5/001* (2013.01); *H02P 6/17* (2016.02); *B25D 2250/005* (2013.01); *B25D 2250/095* (2013.01); *B25D 2250/201* (2013.01); *B25D 2250/221* (2013.01); *B25D 2250/265* (2013.01)

(58) Field of Classification Search
CPC ..... B25B 21/02; B25B 23/1475; B25D 11/04; B25F 5/00
USPC .......................................................... 173/2
See application file for complete search history.

(56) References Cited

U.S. PATENT DOCUMENTS

| | | | |
|---|---|---|---|
| 9,089,956 B2 * | 7/2015 | Arimura | B25B 23/1405 |
| 9,302,376 B2 * | 4/2016 | Agehara | B25F 5/00 |
| 10,011,006 B2 * | 7/2018 | Sergyeyenko | B25B 21/008 |
| 10,637,379 B2 * | 4/2020 | Najjar | B25B 21/00 |
| 10,850,380 B2 * | 12/2020 | Huber | B25F 5/001 |

(Continued)

FOREIGN PATENT DOCUMENTS

| | | |
|---|---|---|
| JP | H10-180643 A | 7/1998 |
| JP | 2001-121442 A | 5/2001 |
| JP | 2012-139800 A | 7/2012 |

(Continued)

OTHER PUBLICATIONS

Jun. 29, 2021 Office Action issued in Japanese Patent Application No. 2017-201059.

*Primary Examiner* — Michelle Lopez
(74) *Attorney, Agent, or Firm* — Oliff PLC

(57) ABSTRACT

An electric working machine in one aspect of the present disclosure includes: a motor, a manipulator, a setter, and a controller. The setter sets first control characteristics preliminarily registered. The first control characteristics are set to achieve a rotational speed of the motor from a minimum rotational speed to a maximum rotational speed with a manipulating range of the manipulator, which is 50% or less of an effective manipulating range thereof.

8 Claims, 11 Drawing Sheets

(56) References Cited

U.S. PATENT DOCUMENTS

2016/0301340 A1  10/2016  Najjar et al.

FOREIGN PATENT DOCUMENTS

| JP | 2013-166247 A | 8/2013 |
| JP | 2014-018868 A | 2/2014 |
| JP | 2017-104969 A | 6/2017 |
| WO | 2015/025677 A1 | 2/2015 |

* cited by examiner

PWM DUTY TABLE

| TRIGGER PULLING AMOUNT | PWM DUTY | | | | |
|---|---|---|---|---|---|
| | LOW | MEDIUM | HIGH | MAXIMUM | BOLT |
| 0 | 0% | 0% | 0% | 0% | 0% |
| 1 | 10% | 10% | 10% | 10% | 10% |
| 2 | 13% | 15% | 18% | 20% | 40% |
| 3 | 16% | 20% | 26% | 30% | 70% |
| 4 | 19% | 25% | 34% | 40% | 100% |
| 5 | 22% | 30% | 42% | 50% | 100% |
| 6 | 25% | 35% | 50% | 60% | 100% |
| 7 | 28% | 40% | 58% | 70% | 100% |
| 8 | 31% | 45% | 66% | 80% | 100% |
| 9 | 34% | 50% | 74% | 90% | 100% |
| 10 | 37% | 55% | 82% | 100% | 100% |

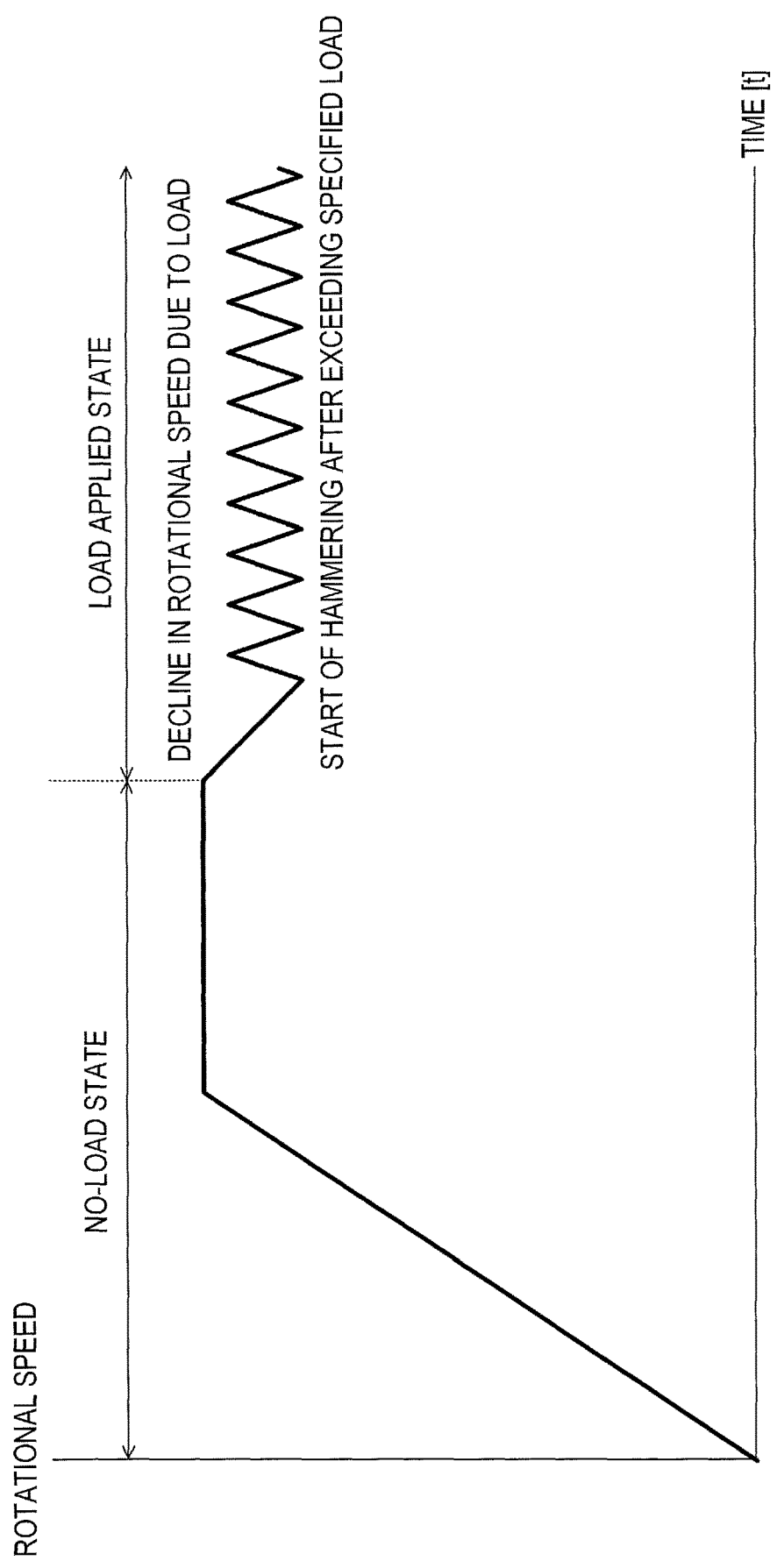

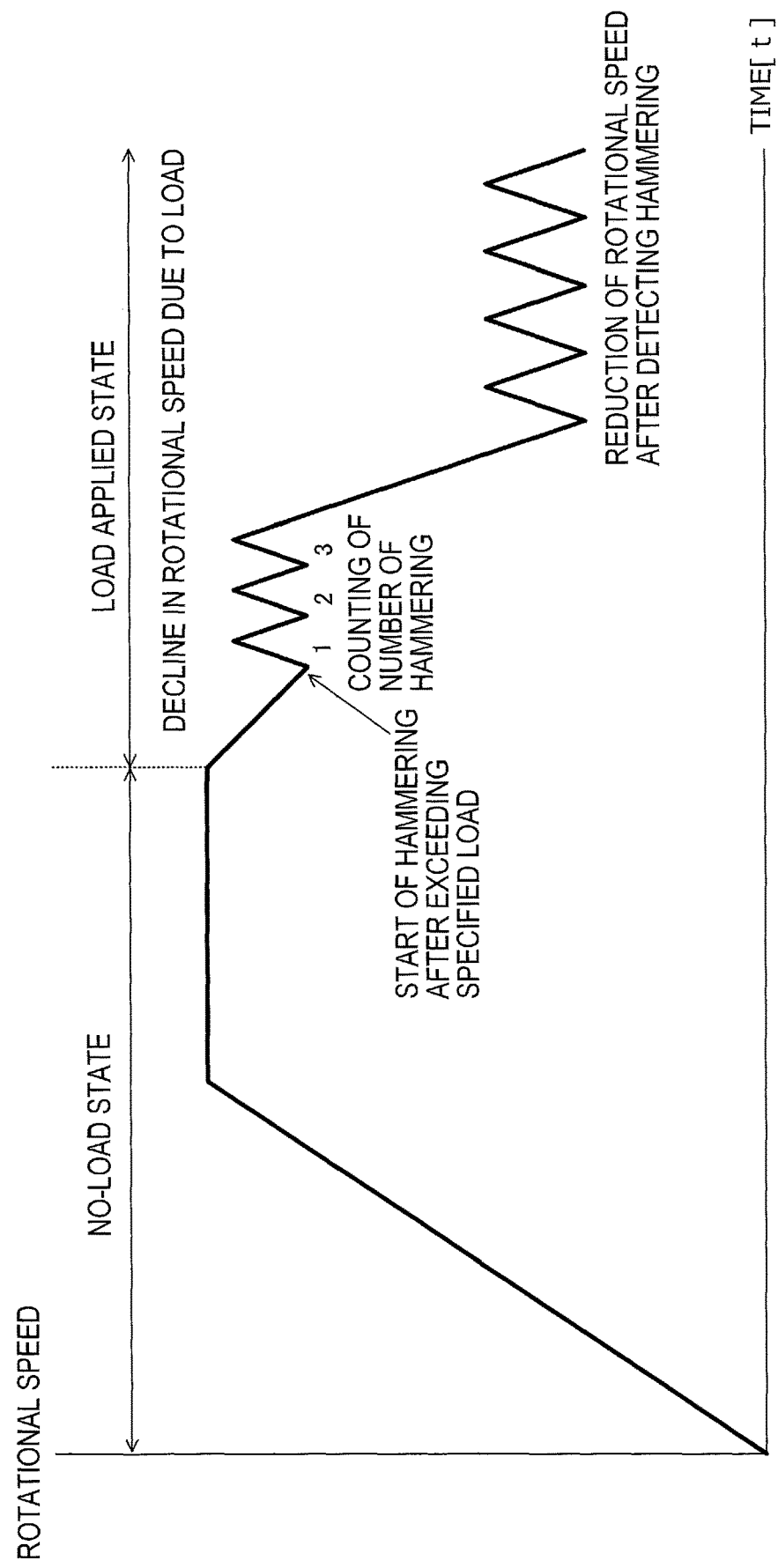

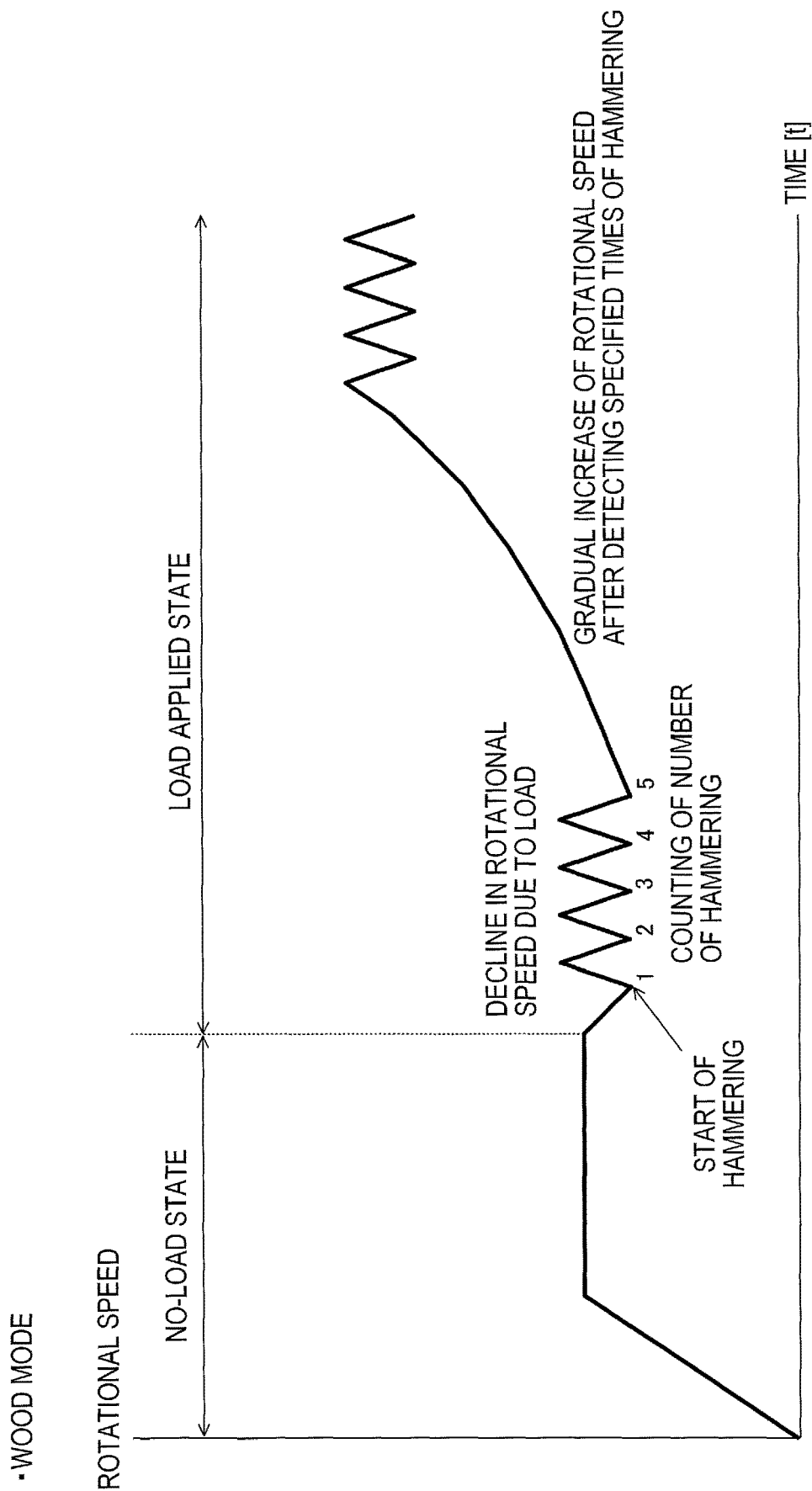

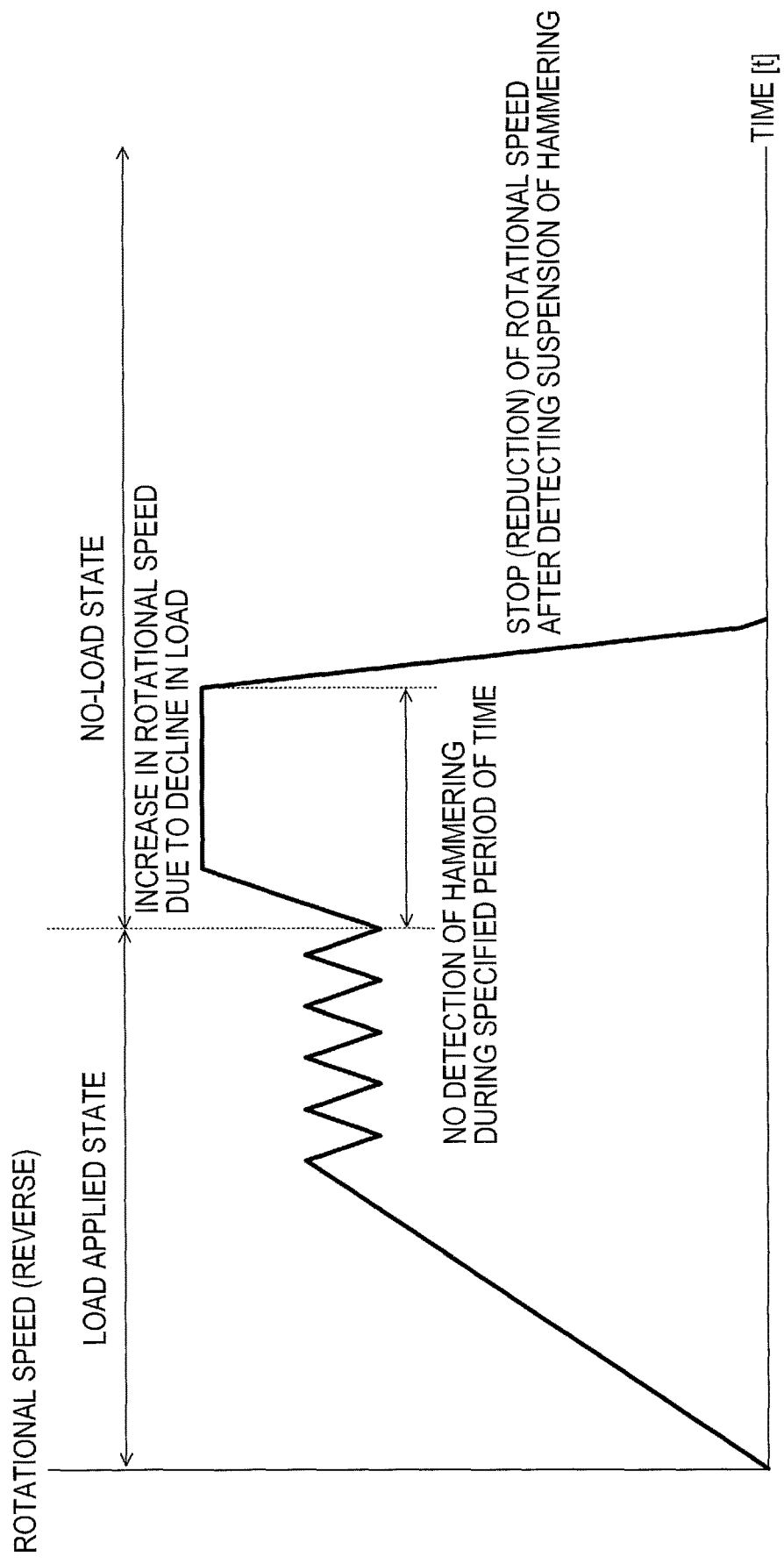

ELECTRIC WORKING MACHINE AND METHOD FOR CONTROLLING MOTOR OF ELECTRIC WORKING MACHINE

CROSS-REFERENCE TO RELATED APPLICATIONS

This application claims the benefit of Japanese Patent Application No. 2017-201059 filed on Oct. 17, 2017 with the Japan Patent Office, the entire disclosure of which is incorporated herein by reference.

BACKGROUND

The present disclosure relates to an electric working machine configured to control a rotational speed of a motor in proportion to a manipulating amount of a manipulator.

An electric power tool disclosed in Japanese Unexamined Patent Application Publication No. 2017-104969 is configured to control a rotational speed of a motor according to a manipulating amount of a trigger.

In such an electric power tool, control characteristics of the motor are set preliminarily such that the rotational speed of the motor changes between when a pulling amount of the trigger is small and when that is large and then, becomes its maximum when the pulling amount of the trigger exceeds a specified amount.

SUMMARY

In the aforementioned electric power tool, the control characteristics of the motor are set such that the rotational speed of the motor becomes the maximum rotational speed when the trigger is fully pulled and the pulling amount reaches near the maximum pulling amount.

This enables a user to adjust the rotational speed of the motor by manipulation of the trigger. However, in order to rotate the motor at the maximum rotational speed set by the control characteristics, it is necessary for the user to fully pull the trigger.

Thus, in a work with the electric power tool, where rotating the motor at the maximum rotational speed is frequently required, the user is frequently required to fully pull the trigger, leading to a problem of finger fatigue.

For example, in a case where a bolt tightening work is performed with an impact driver having a hammering mechanism, since a tool bit that is driven by a motor is engaged with a head portion of a bolt, even when the motor is rotated at the maximum rotational speed immediately after start of the work, the tool bit does not come off from the bolt.

Therefore, when such a tightening work is performed, the user fully pulls the trigger immediately after the start of the work in order to firmly tighten the bolt through the hammering mechanism. However, this leads to the finger fatigue of the user, thereby disabling continuation of the work for a long period of time.

In one aspect of the present disclosure, it is desirable to enable driving of a motor of an electric working machine at a maximum rotational speed even when a manipulating amount of a manipulator of the electric working machine is small.

An electric working machine in one aspect of the present disclosure includes: a motor; a manipulator for commanding driving of the motor; a setter; and a controller. The setter sets first control characteristics preliminarily registered, the first control characteristics being set to achieve a rotational speed of the motor from a minimum rotational speed to a maximum rotational speed of the first control characteristics with a range that is 50% or less of an effective manipulating range of the manipulator, the effective manipulating range being a manipulating range of the manipulator, where the motor is drivable. The controller controls the driving of the motor in accordance with the first control characteristics set with the setter such that the greater a manipulating amount of the manipulator, the greater the rotational speed of the motor.

In such an electric working machine in one aspect of the present disclosure, thus, the controller controls the driving of the motor by using the set first control characteristics, which enables the rotational speed of the motor to reach its maximum by a slight manipulation of the manipulator.

Accordingly, in a case when a user performs a work where the motor is rotated at the maximum rotational speed, setting the first control characteristics via the setter makes it possible for the user to allow the motor to be rotated at the maximum rotational speed without manipulating the manipulator by almost the maximum manipulating amount. As a result, the user can continue such a work for a long period of time without feeling finger fatigue due to the manipulation of the manipulator.

In this regard, the setter may set the first control characteristics in response to a Bolt mode being set as a mode of the motor. The Bolt mode is a mode for rotating the motor in a state where a tool bit driven by the motor is fit over a bolt or a nut.

Specifically, in the Bolt mode, the motor is allowed to be rotated at a high speed immediately after start of the work as described above, which can enhance efficiency. Accordingly, allowing the first control characteristics to be set in the Bolt mode enables the user to achieve high-speed rotation of the motor with the slight manipulation of the manipulator, which can mitigate the finger fatigue of the user.

In the Bolt mode, the first control characteristics may be set to stop or reduce the rotation of the motor in response to a decline in a load applied to the motor being rotated reversely so as to loosen tightening of the bolt or the nut.

In such a manner, when the motor is being rotated reversely to loosen the tightening of the bolt or the nut, the motor does not continue rotating after the tightening is loosened and the load applied to the motor declines, which can inhibit the bolt or the nut from coming off and falling from the tool bit.

In order to control the driving of the motor with the first control characteristics, it is necessary for the controller to sense a decline in the load during the reverse rotation of the motor. The controller can sense the decline in the load by, for example, the rotational speed of the motor or a change in the current flowing in the motor.

In a case of the electric working machine equipped with the hammering mechanism where hammering of the output shaft occurs, the controller may be configured to determine that the load has declined in response to suspension of occurrence of the hammering while the motor is being rotated reversely with the aforementioned first control characteristics.

Also, the setter may set control characteristics including second control characteristics that are different from the first control characteristics. The setter may set the second control characteristics in response to a screw-tightening mode being set as the mode of the motor. The screw-tightening mode is a mode for rotating the motor in a state where a screw-tightening tool bit driven by the motor is engaged with a groove provided in a head portion of a screw. This enables the user to adjust the rotational speed of the motor by manipulating the manipulator when performing screw-tightening.

In this case, moreover, the second control characteristics may include a plurality of control characteristics whose maximum no-load rotational speeds of the motor are different from each other. This enables the user to select the maximum rotational speed of the motor according to work conditions such as a size of a screw, a type of a workpiece, and the like, or depending on preference of the user when performing screw-tightening.

Further, the manipulator may include a trigger configured to be pulled by the user.

Another aspect of the present disclosure is a method for controlling a motor of an electric working machine, the method including: sensing a manipulating amount of a manipulator for commanding driving of the motor; setting specified control characteristics preliminarily registered, the specified control characteristics being set to achieve a rotational speed of the motor from a minimum rotational speed to a maximum rotational speed of the specified control characteristics with a range that is 50% or less of an effective manipulating range of the manipulator, the effective manipulating range being a manipulating range of the manipulator, where the motor is drivable; and controlling the driving of the motor in accordance with the set specified control characteristics such that the greater the manipulating amount, the greater the rotational speed of the motor.

Such a method can produce effects similar to those of the above-described electric working machine.

BRIEF DESCRIPTION OF THE DRAWINGS

Example embodiments of the present disclosure will be described below with reference to the accompanying drawings, in which:

FIG. 5 is a time chart showing a change in a rotational speed when the motor is controlled by using the control characteristics for normal times shown in FIG. 4B;

FIG. 6 is a time chart showing a change in the rotational speed when the motor is controlled by using the control characteristics of a Tex mode;

FIG. 7 is a time chart showing a change in the rotational speed when the motor is controlled by using the control characteristics of a Wood mode;

FIG. 8 is a time chart showing a change in the rotational speed when the motor is controlled by using the control characteristics of a Bolt mode where the motor is rotated reversely;

DETAILED DESCRIPTION OF THE PREFERRED EMBODIMENTS

One embodiment is a rechargeable impact driver 1. Tex is a registered trademark. However, "Tex" in the following description and claims is used broadly to refer to screws with a built-in drill at the tip, and not as a trademark or a brand. This is a term of art in the industry.

<1. Configuration>

Figure 1:
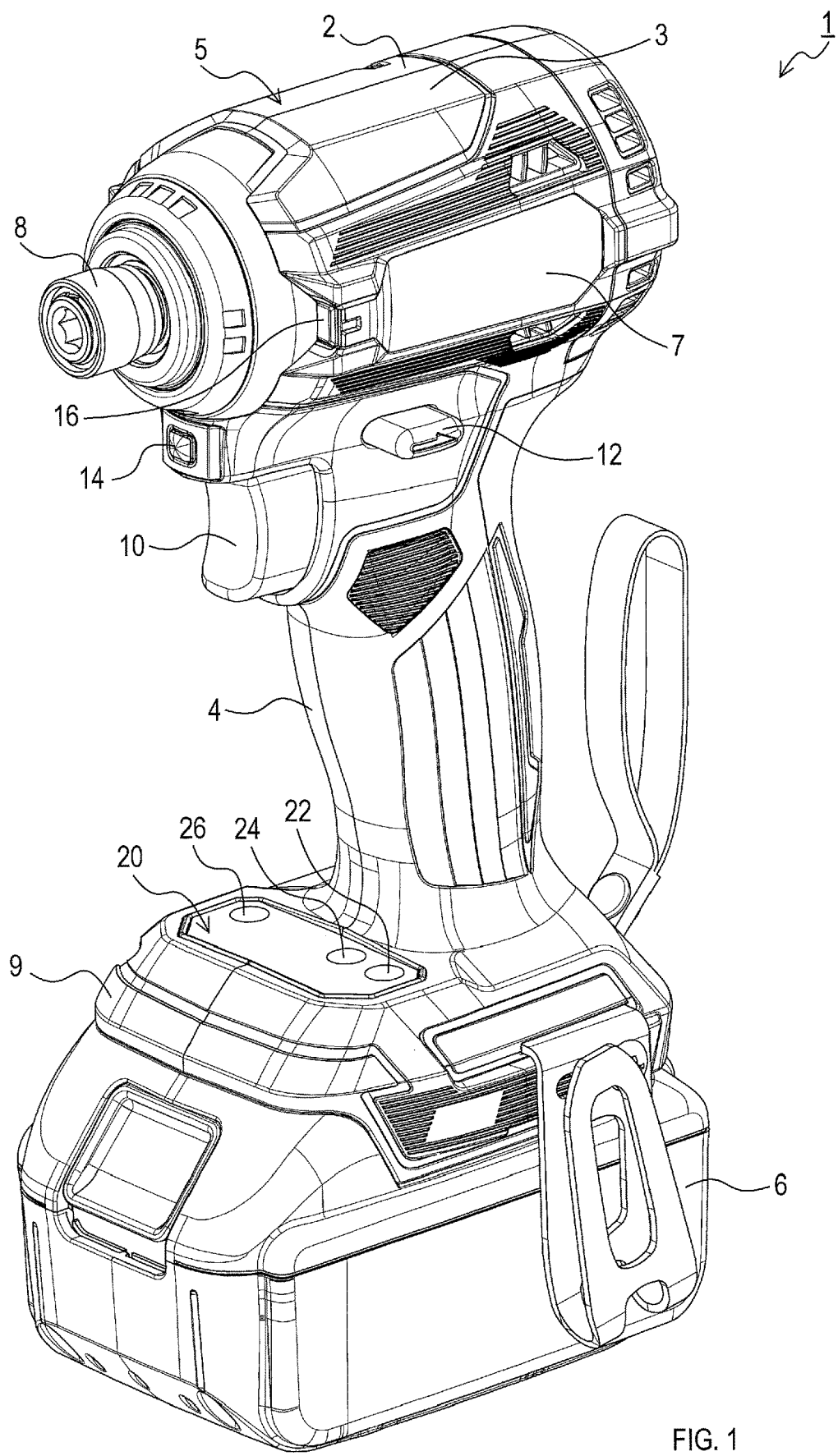
FIG. 1 is a perspective view showing a configuration of a rechargeable impact driver as a whole according to an embodiment.

In FIG. 1, the rechargeable impact driver 1 (hereinafter referred to as a driver 1) is an electric power tool. The driver 1 includes a main body housing 5. The main body housing 5 is configured through assembling right-half and left-half housings 2 and 3 together, and in a lower section thereof, a grip 4 is provided. In the main body housing 5, provided at a lower end of the grip 4 is a battery mounting portion 9 for mounting a battery pack 6 in an attachable-and-detachable manner.

The main body housing 5 includes a motor storage portion 7 in a left side of the driver 1. The motor storage portion 7 stores a motor 30 (shown in FIG. 2) that powers the driver 1. In the main body housing 5, stored in front of the motor storage portion 7 are a deceleration mechanism (not shown) and a hammering mechanism (not shown).

At a leading end of the main body housing 5, provided is a chuck sleeve 8 for mounting various tool bits (not shown) such as a driver bit and a socket bit to an output shaft that is driven by the motor 30.

The hammering mechanism, for example, is equipped with a spindle, a hammer, and an anvil. The spindle is rotated through the deceleration mechanism. The hammer rotates together with the spindle and is movable in an axis direction. Provided in front of the hammer is the anvil and at a leading edge thereof, the tool bit is to be mounted.

Specifically, in the hammering mechanism, when the spindle rotates along with rotation of the motor 30, the anvil rotates through the hammer, and thus, the chuck sleeve 8 (holding the tool bit) rotates.

Then, when screw-tightening by the tool bit progresses and a load to the anvil is heightened, the hammer recedes in resisting to a biasing force of a coil spring and comes off from the anvil. The hammer after coming off from the anvil rotates together with the spindle and proceeds forward by the biasing force of the coil spring so as to engage with the anvil again.

As a result, a hammering force is intermittently applied to the anvil and additional screw-tightening is performed by the tool bit. Since such a hammering mechanism has been known conventionally, a detailed explanation thereon is omitted herein.

The grip 4 is a gripping portion to be gripped when a user uses the driver 1, and at an upper leading end of the grip 4, a trigger 10 is provided. The trigger 10 is a portion to be pulled by a finger of the user who is gripping the grip 4.

Figure 2:
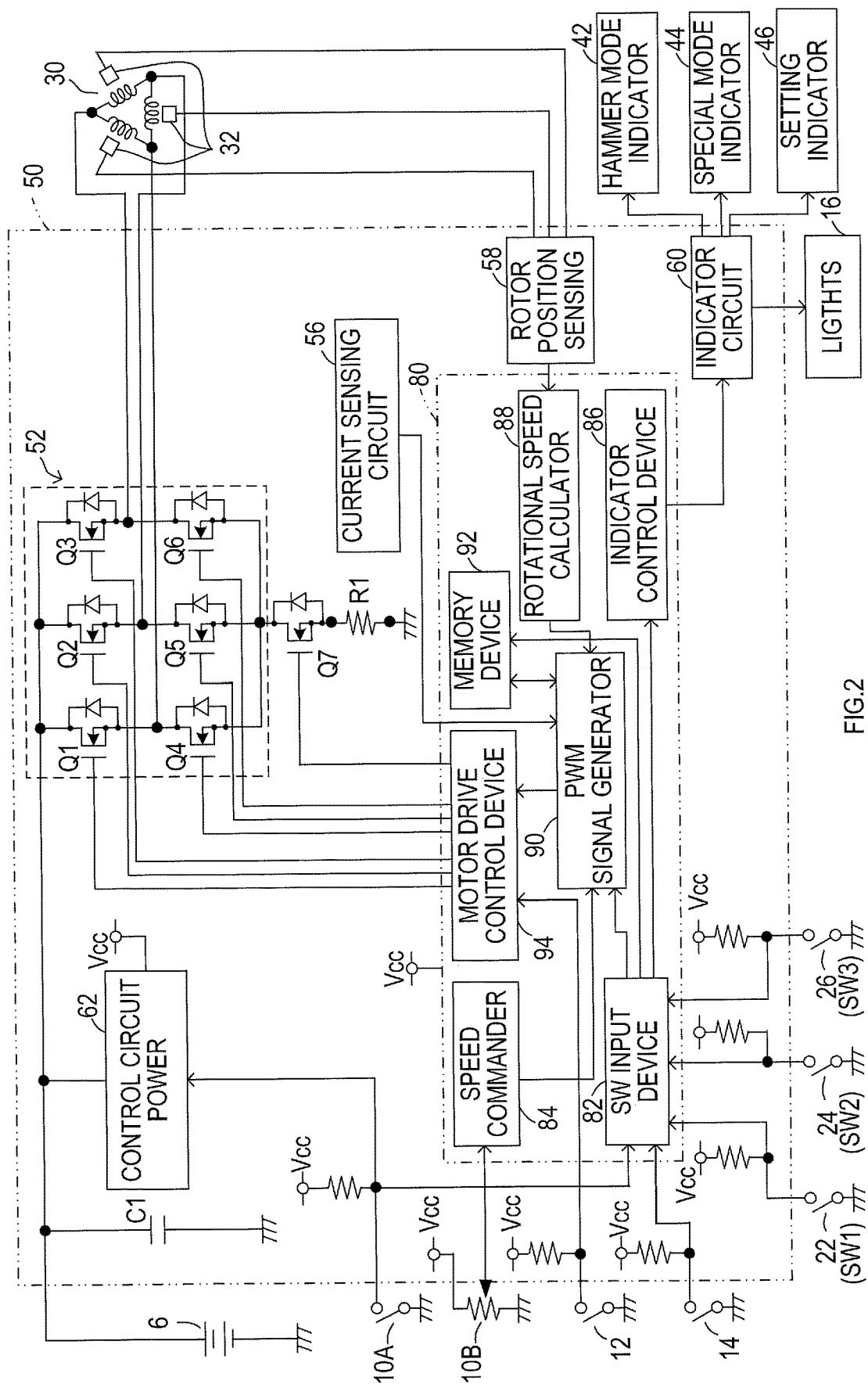
FIG. 2 is a block diagram showing an electrical configuration of a motor drive device.

Provided in the trigger 10 are a main switch 10A (see FIG. 2) and a manipulating amount sensor 10B (see FIG. 2). While the trigger 10 is being pulled, the main switch 10A is in an ON state The manipulating amount sensor 10B includes a variable resistor where a resistance value changes according to a pulling amount of the trigger 10, and senses the pulling amount of the trigger 10 (in other words, a manipulating amount).

Further, on an upper side of the trigger 10 (on an upper end side of the grip 4) is a mode-change switch 14 as one example of a second setter of the present disclosure. The mode-change switch 14 is a switch for changing a mode of the driver 1 to a desired mode according to a manipulation made in the switch, and may act as a toggle switch, toggling between two modes.

In the grip 4, provided on a rear side of the mode-change switch 14 is a forward/reverse changeover switch 12. The forward/reverse changeover switch 12 is a switch for switching a rotational direction of the motor 30 between a forward direction that is a screw-tightening direction, and a reverse direction.

In the main body housing 5, provided as lighting portions for lighting an area ahead are a pair of right and left lights 16 (only the left side is shown) with the chuck sleeve 8 therebetween. The lights 16 includes LEDs. The lights 16 light up their LEDs when a signal following the manipulation made in the mode-change switch 14 is input to a control circuit 80 (see FIG. 2) so as to notify the user that the mode-change switch 14 is manipulated. That is, the lights 16 also serve as one example of a second notifiers (as a notifier for the second setter).

Further in the main body housing 5, an operation panel 20 is provided in the battery mounting portion 9 disposed downward of the grip 4.

In the operation panel 20, provided as one example of a first setters of the present disclosure are a hammering switch 22 and a special switch 26, which are switches for selectively setting the mode of the driver 1 out of preliminarily set eight types of the mode (four hammer modes and four special modes). Also in the operation panel 20, provided is a light switch 24 used for lighting up or turning off the LEDs of the lights 16.

Figure 3:
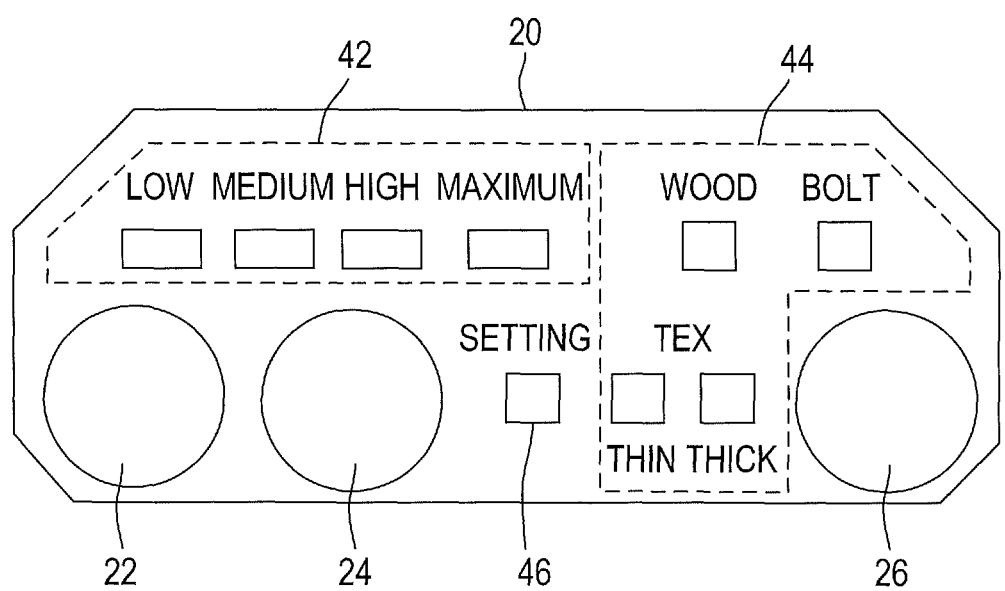
FIG. 3 is a plan view showing a layout of switches and indicators in an operation panel.

As shown in FIG. 3, also provided in the operation panel 20 as indicators for showing a setting status of the mode are: hammer mode indicators 42; special mode indicators 44; and a setting indicator 46.

The hammer mode indicators 42 display (or indicate, or light up) the single hammer mode set (selected) with the hammering switch 22. Provided in the hammer mode indicator 42 are four indicators for displaying the four types of the hammer mode, which are selectable sequentially by a manipulation of the hammering switch 22.

The special mode indicators 44 displays the special mode set with the special switch 26. Provided in the special mode indicator 44 are four indicators for showing the four types of the special mode, which are selectable sequentially by a manipulation of the special switch 26.

The setting indicator 46 includes an LED and lights up the LED when the current mode displayed in the hammer mode indicator 42 or the special mode indicator 44 is the mode set with the mode-change switch 14. That is, the setting indicator 46 lights up the LED so as to notify that the current mode has been set with the mode-change switch 14. The setting indicator 46 serves as one example of a first notifier of the present disclosure. The hammer mode indicators 42, the special mode indicators 44, and the setting indicator 46 may include light sources other than LEDs, or may include a part of a touch screen LCD (liquid crystal display), or any other type of display.

The eight "operation" modes, which are set with the hammering switch 22 and the special switch 26, will be described specifically later. See FIG. 3.

A battery stored in the battery pack 6 in the present embodiment is, for example, a repeatedly rechargeable battery such as a lithium ion battery.

As shown in FIG. 2, the motor 30 in the present embodiment is configured with a three-phase brushless motor including armature windings of respective phases, U-phase, V-phase, and W-phase. Further, the motor 30 is equipped with a rotation sensor 32 for sensing a rotational position (angle) of the motor 30.

The rotation sensor 32 includes, for example, a Hall IC configured with three Hall elements disposed correspondingly to the respective phases of the motor 30. The rotation sensor 32 generates a rotation sensing signal per specified rotational angle of the motor 30.

Also provided inside the grip 4 is a motor drive device 50 that receives electric power supply from the battery pack 6 and controls driving of the motor 30.

As shown in FIG. 2, provided in such a motor drive device 50 are a drive circuit 52, a current sensing circuit 56, a rotor position sensing circuit 58, an indicator circuit 60, a control circuit power supply circuit 62, and a control circuit 80.

The drive circuit 52 is a circuit that receives power supply from the battery pack 6 and flows the current to the windings of the respective phases of the motor 30. In the present embodiment, the drive circuit 52 is configured as a three-phase full bridge circuit including six switching devices Q1 to Q6. Each of the switching devices Q1 to Q6 in the present embodiment is a metal-oxide-semiconductor field-effect transistor (MOSFET).

The three switching devices Q1 to Q3 in the drive circuit 52 are provided between respective terminals U, V, and W of the motor 30 and a power line connected to a positive side of the battery pack 6 as so-called high-side switches.

Further, the other three switching devices Q4 to Q6 are provided between the respective terminals U, V, and W of the motor 30 and a ground line connected to a negative side of the battery pack 6 as so-called low-side switches.

Provided on a power supply path from the positive side of the battery pack 6 to the drive circuit 52 is a capacitor C1 for reducing fluctuation in the battery voltage.

Also provided on a power supply path from the drive circuit 52 to the negative side of the battery pack 6 are a switching device Q7 for continuing or discontinuing a current flow thereon and a resistor R1 ("shunt resistor") for sensing the current. The current sensing circuit 56 outputs a voltage between both ends of the resistor R1 as a current sensing signal to the control circuit 80.

The rotor position sensing circuit 58 is a circuit for sensing the rotational position of the motor 30 based on the sensing signal from the rotation sensor 32. The rotor position sensing circuit 58 outputs a sensing signal of the rotational position to the control circuit 80.

The indicator circuit 60 is a circuit for lighting up (according to a command from the control circuit 80) one or more of: the hammer mode indicators 42; the special mode indicators 44; and the setting indicator 46 in the operation panel 20; and the lights 16.

The control circuit power supply circuit 62 is a circuit for supplying power to respective portions inside the motor drive device 50. The control circuit power supply circuit 62 receives electric power supply from the battery pack 6 and generate a specified power supply voltage (constant voltage) Vcc. The generated power supply voltage Vcc is supplied to the control circuit 80, the indicator circuit 60, pull-up resistors disposed on input paths from the aforementioned various switches, and the like.

The control circuit power supply circuit 62 starts up when the main switch 10A is turned on, and stops (automatically) when a certain period of time or more has passed with no operation made in the main switch 10A, the mode-change switch 14, the hammering switch 22, and the special switch 26.

The control circuit 80 includes microcomputers including a CPU, a ROM, a RAM, and the like and includes a memory device 92. The memory device 92 includes a non-volatile memory (defined as a non-transitory storage medium) where data is rewritable, and control characteristics of the motor 30 for the aforementioned respective modes and the like are stored in the memory device 92.

The control circuit 80 may include, instead of or in addition to the microcomputers, a combination of various separate electronic components, an Application Specified Integrated Circuit (ASIC), an Application Specific Standard Product (ASSP), a programmable logic device such as a Field Programmable Gate Array (FPGA), or a combination thereof.

Connected to the control circuit 80, are: the main switch 10A; the manipulating amount sensor 10B; the forward/reverse changeover switch 12; the mode-change switch 14; the hammering switch 22; the light switch 24; and the special switch 26.

According to a program performed by the CPU, the control circuit 80 serves as a SW input device 82, a speed commander 84, an indicator control device 86, a rotational speed calculator 88, a pulse width modulation (PWM) signal generator 90, and a motor drive control device 94.

The SW input device 82 detects an ON state or an OFF state of the main switch 10A, the mode-change switch 14, the hammering switch 22, the light switch 24, and the special switch 26, and then performs setting of the aforementioned modes as well as setting of a light-ON state or a light-OFF state of various LEDs in the various indicators (42, 44, and 46) and in the lights 16.

The mode set in the SW input device 82 is stored in the memory device 92 and used by the PWM signal generator 90 for generating a PWM signal. Also, the light-ON state or the light-OFF state of the various LEDs is output to the indicator control device 86. According to such output from the SW input device 82, the indicator control device 86 lights up or turns off the various LEDs via the indicator circuit 60.

The speed commander 84 senses the manipulating amount of the trigger 10 based on an input signal from the manipulating amount sensor 10B, and outputs the sensed manipulating amount to the PWM signal generator 90 as a speed command during the driving of the motor.

The rotational speed calculator 88 calculates a duty percentage or a duty ration (associated with a no-load rotational speed of the motor 30) based on the sensing signal from the rotor position sensing circuit 58, and outputs calculation results to the PWM signal generator 90.

The PWM signal generator 90, then, reads out from the memory device 92 the control characteristics corresponding to the mode set in the SW input device 82 and according to the control characteristics, generates the PWM signal that is a control signal for driving the motor 30. For example, see the PWM Duty Table in FIG. 4B.

Specifically, the PWM signal generator 90 generates the PWM signal based on the control characteristics read out from the memory device 92, the speed command (in other words, the manipulating amount of the trigger 10) input from the speed commander 84, and the rotational speed of the motor 30, which is input from the rotational speed calculator 88.

Further, based on the sensing signal from the current sensing circuit 56, the PWM signal generator 90 monitors a current flowing in the motor 30. When an excessive current flows in the motor 30, the PWM signal generator 90 commands the motor drive control device 94 to stop the motor 30 or reduce the rotational speed of the motor 30.

Then, according to the PWM signal generated by the PWM signal generator 90, the motor drive control device 94 allows a current to flow to the windings of the respective phases of the motor 30 so as to rotate the motor 30 by turning on or off the respective switching devices Q1 to Q6, which are included in the drive circuit 52.

Further, the motor drive control device 94, based on an input signal input thereto from the forward/reverse changeover switch 12, changes the rotational direction of the motor 30.

<2. Modes>

The modes set with the hammering switch 22 and the special switch 26 will be described next.

As shown in FIG. 3, at the driver 1 of the present embodiment, the four types of the hammer mode ("Maximum", "High", "Medium", and "Low"), and the four types of the special mode ("Wood", "Bolt", "Tex (thin)", and "Tex (thick)") total eight possible modes.

The modes specify control methods of the motor 30, and in order to realize the control methods, the control characteristics required for controlling the motor 30 in each mode are preliminarily stored (memorized or registered) in the memory device 92.

The four types of the hammer mode (Maximum, High, Medium, and Low) are changeable in an order of Maximum→High→Medium→Low→Maximum . . . through operating the hammering switch 22. The reverse order (from lowest to highest, and then repeating) is also possible. As previously mentioned this sequential order may loop back, or may reverse order when reaching the last type.

The four types of the special mode (Wood, Bolt, Tex (thin), and Tex (thick)) are similarly changeable through operating the special switch 26 in an order of Wood→Bolt-→Tex (thin)→Tex (thick) Wood . . . .

Figures 4A, 4B:
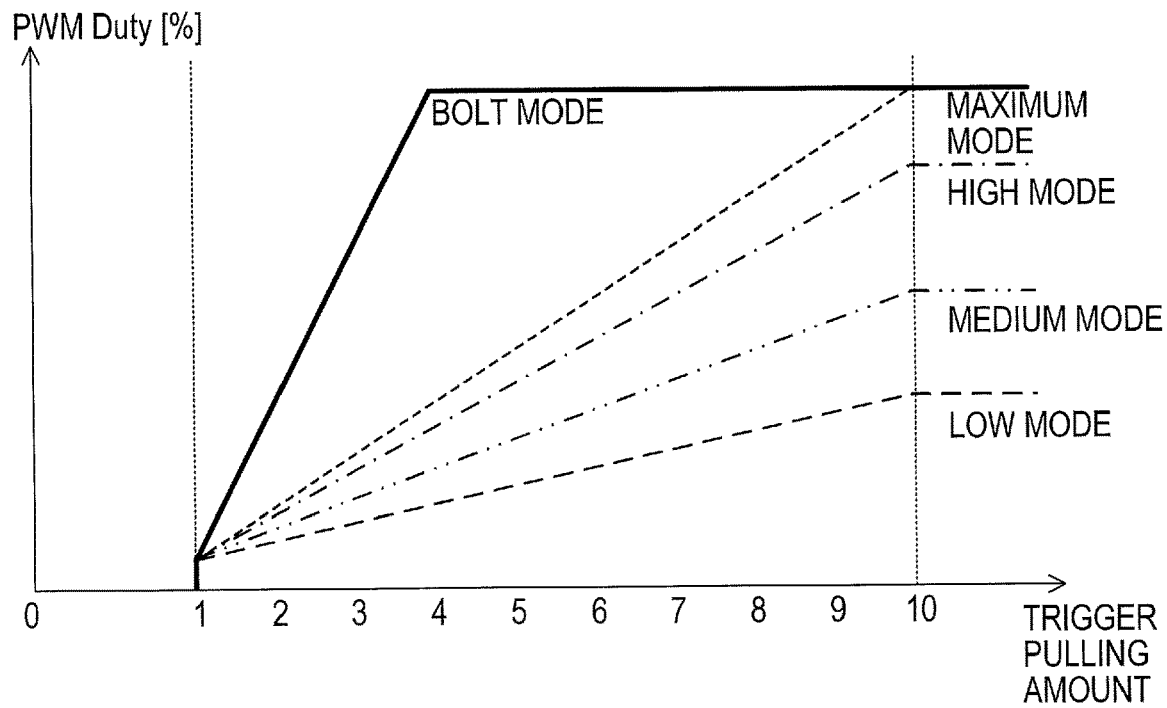
FIG. 4A is a graph showing control characteristics used for rotation control of the motor in a controller.
FIG. 4B is a mapping table of characteristic control used for the rotation control of the motor.

As exemplified in FIGS. 4A and 4B, the hammer modes are also known as typical modes for screw-tightening. And for each of the four hammer modes, set are the control characteristics for setting a duty ratio of the control signal (the PWM signal) during the driving of the motor 30 in proportion to the pulling amount (manipulating amount) of the trigger 10. The control characteristics exhibit a corresponding relationship between the pulling amount of the trigger 10 and the duty ratio.

Specifically, the control characteristics for Maximum of the hammer mode are set to bring the duty ratio of the PWM signal to its maximum (100%) when the pulling amount of the trigger is largest, for example, 10 on a scale of the trigger pulling amount from 1 to 10 (or from 10% to 100% of the maximum trigger pulling). When the duty ratio is the maximum (100% in the Maximum mode), the motor 30 rotates at the maximum speed (in a no-load condition).

The control characteristics for Maximum, High, Medium, and Low of the hammer mode are set so that in sequence thereof, the duty ratio of the PWM signal is respectively less (see FIG. 4A) when the pulling amount of the trigger is the largest amount of 10. Accordingly, in High, Medium, or Low of the hammer mode, when the user pulls the trigger 10 by the largest amount, the maximum rotational speed of the motor 30 is smaller compared to that in Maximum of the hammer mode.

For any one of Maximum, High, Medium, and Low of the hammer mode, the control characteristics are set to bring the duty ratio of the PWM signal to the minimum value near 0 when the trigger pulling amount changes from 0 to 1 (the smallest non-zero pulling amount). And the control characteristics are set to increase the duty ratio incrementally along an increase in the trigger pulling amount from that when the trigger pulling amount is 1 (a first or triggering value) up to that when the trigger pulling amount reaches 10 (a maximum value).

Accordingly, in the hammer modes, a manipulating range where the trigger pulling amount is 1 or more is an effective manipulating range where the motor 30 is drivable. And in the hammer modes, within such an effective manipulating range, a domain of the trigger pulling amount from 1 to 10 is a controllable range where the PWM duty (associated with a no-load rotational speed) of the motor 30 is adjustable.

As a result, in the hammer mode, when the trigger 10 is pulled (manipulated), the rotational speed of the motor 30 gradually increases by a so-called soft start control as shown in FIG. 5 and if the motor 30 is in a no-load state, the rotational speed of the motor 30 becomes a constant rotational speed that corresponds to the pulling amount of the trigger 10.

When screw-tightening is performed and a load is applied to the motor 30, the rotational speed of the motor 30 decreases in response to such a load (see FIG. 5). Then, when hammering occurs, since the load applied to the motor 30 decreases intermittently, the rotational speed of the motor 30 changes intermittently.

Above is an example where the effective manipulating range and the controllable range are set with the scale of the trigger pulling amount from 1 to 10. However, the manipulating range and the controllable range may be set appropriately with an entire manipulating range of the trigger 10 (such as from 0 to 10), and such a setting is not limited to the above-described setting method.

The two Tex modes (Tex (thin) and Tex (thick)) are the modes for tightening a Tex screw whose leading end is provided with a drill for drilling a screw-hole on a workpiece. The term Tex is used here as a descriptive term of a common type of screw, and is not used to identify a brand or a trademark.

FIG. 5 shows typical curves for the four hammer modes and for the Bolt mode, wherein the Bolt mode is for tightening a bolt. FIG. 8 illustrates the Bolt mode for loosening a bolt, and is discussed below.

As shown in FIG. 6, for the Tex (thick) mode, the control characteristics are set to drive the motor according to the PWM signal of a specified duty ratio corresponding to a pulling amount of the trigger 10 in a time period from start of the driving of the motor 30 till occurrence of hammering like in the hammer mode. Then, when the hammering occurred a specified number of times, a determination that a screw-hole is formed on a workpiece is made. For the Tex (thick) mode, the control characteristics are set to reduce the duty ratio of the PWM signal so as to decrease the rotational speed of the motor 30 once the determination that the screw-hole is completed (based on counting a number of the hammering, as shown in FIG. 6) is made.

According to such settings, the motor 30 is rotated at a high speed after the driving of the motor 30 starts until the screw-hole forming on the workpiece is completed and after the completion of the screw-hole forming, the rotational speed of the motor 30 decreases. This enables screw-tightening to be steadily performed.

In this connection, the hammering can be detected by, for example, a change in the rotational speed of the motor 30, a change in the current (an amplitude of the current), vibration applied to the electric power tool, and/or the like. Further, the completion of the screw-hole forming by a Tex screw can be detected by not only a number of the hammering occurrence but also an elapsed time after detecting the hammering occurrence and the like. Further, it may be possible to change a threshold value used for detecting the hammering to, for example, a battery voltage, a motor rotational speed, and the like depending on a condition of the driving of the motor.

Similarly, depending on a thickness of a workpiece, the user can appropriately select either one of the Tex modes: Tex (thin); or Tex (thick).

In the Tex (thin) mode, since a workpiece is thinner compared to a case of the Tex (thick) mode, it takes less time to perform hole-drilling and screw-tightening on a workpiece by a Tex screw. Thus, for the Tex (thin) mode, the control characteristics are set to stop the driving of the motor 30 when the hammering occurred a specified number of times after the start of the driving of the motor. The Tex (thin) mode may also operate based upon a reduced number of hammer counts relative to the Tex (thick) mode.

For the Wood mode (one of the four special modes), the control characteristics are set such that the duty ratio of the PWM signal are set in proportion to the pulling amount of the trigger 10 while being pulled. For the Wood mode, the control characteristics are set such that the duty ratio therein is smaller than that in Maximum of the hammer mode as cases of Low and Medium of the hammer mode.

For the Wood mode, as shown in FIG. 7, the control characteristics are set to gradually increase the duty ratio of the PWM signal after the hammering occurred a specified number of times following the start of the driving of the motor. This is because, in a case of fixing a screw (a wood screw) to a wood, the screw is not yet cut thereinto immediately after the start of the driving of the motor 30 and it is necessary to rotate the screw slowly until the screw is cut into the wood.

Specifically, in the Wood mode, the motor 30 is driven at a low rotational speed after the start of the driving of the motor 30 and then, when the hammering occurred a specified number of times and a determination that the screw is cut into the wood is made, the rotation of the motor 30 increases gradually. According to such settings of the Wood mode, screw-fixing and screw-tightening to the wood can be performed efficiently in a short period of time.

The Bolt mode in FIG. 8 is for tightening or removing a bolt (or a nut).

When tightening or removing the bolt (or the nut) by rotating the motor 30, the tool bit is fit over a head of the bolt (or the nut). By doing so, in the Bolt mode, slipping off of the bolt (or the nut) from the tool bit as usually does not occur. Alternatively, some bolts may have internal openings for attachment, such as hexagonal holes or torx holes.

For this reason, as shown in FIGS. 4A and 4B, the control characteristics for the Bolt mode (for example, in a forward state of the forward/reverse changeover switch 12) are set such that the trigger pulling amount with which the duty ratio of the PWM signal (in other words, the rotational speed of the motor 30) becomes its maximum is smaller as compared to those in the hammer modes. For example, the (forward state) Bolt mode in FIG. 4A reaches 100% PWM duty at a trigger pulling amount of just 4, in comparison to 10 for the four hammer modes. Note, FIG. 8 shows characteristics for the bolt mode during reverse rotation (in a reverse state of the forward/reverse changeover switch 12).

Specifically, for the Bolt mode, the control characteristics of the motor 30 as examples of first control characteristics (specified control characteristics) of the present disclosure are set such that the duty ratio of the PWM signal (in other words, the rotational speed of the motor 30) becomes its maximum when the trigger pulling amount is 4 or more, but less than 10.

Also for the Bolt mode, in order to allow the tightening or the removing the bolt (or the nut) to be performed quickly, the control characteristics are set such that, when the trigger pulling amount is 4 or more, the duty ratio of the PWM signal becomes a value that is the same (or approximately the same) as the maximum value of the duty ratio in Maximum of the hammer mode.

Accordingly, in the Bolt mode, the motor 30 rotates at the maximum speed when the user pulls the trigger 10 by a smaller amount compared to a case of Maximum of the hammer mode, and this enables the tightening or the removing of the bolt (or the nut) in the Bolt mode to be performed efficiently in a short period of time.

Further in the Bolt mode, it is possible for the user to rotate the motor at a high speed without pulling the trigger 10 by almost the maximum pulling amount. Thus, when tightening or removing the bolt (or the nut) in the Bolt mode, it is possible to inhibit the user from abandoning continuation of a work for a long period of time because of finger fatigue due to manipulation of the trigger 10.

In FIG. 8, when loosening the bolt (or the nut) by rotating the motor 30 reversely in the Bolt mode, since a load is applied to the motor 30 from the bolt (or the nut) at start of the driving of the motor 30, hammering occurs almost immediately.

Then, when the bolt (or the nut) is loosened by such hammering, the load applied to the motor 30 declines and the rotational speed of the motor 30 increases.

For the Bolt mode, therefore, as shown in FIG. 8, when the motor 30 rotates reversely, the control characteristics are set to stop (or reduce) the driving of the motor 30 in response to detecting no hammering for a specified period of time after the driving of the motor 30 starts and the hammering is detected.

Accordingly, in the Bolt mode, when loosening the tightening of the bolt (or the nut), falling of the bolt (or the nut) from the tool bit due to unnecessary continuation of the rotation of the motor 30 can be inhibited, or can be assumed/calculated to have already occurred. This specific period of time can be calculated in order to keep the bolt (or nut) slightly engaged, or to fully disengage the bolt, depending upon what is desired. Thus, the Bolt mode may be described as two distinct modes (or sub-modes): a forward-rotation bolt mode; and a reverse-rotation bolt mode. The reverse-rotation bolt mode may be indicated by flashing the bolt mode indictor, or by adding a "reverse" indicator (not shown) as an additional indicator showing the status of the forward/reverse changeover switch 12. Other modes may or may not have distinct reverse modes. Alternatively, the bolt mode may be described as a single mode, with certain characteristics when the driver 1 is in forward status (due to the forward/reverse changeover switch 12), and different characteristics when the driver 1 is in a reverse status.

The decline in the load applied to the motor 30 in the bolt mode can be sensed also by the rotational speed of the motor 30 or the change in the current. By using such a speed or a change as a parameter instead of using the detection of the hammering, the decline in the load applied to the motor 30 can be sensed. In this manner, the motor 30 of an electric working machine without the hammering mechanism can be driven by using a modified Bolt mode.

<3. Process>

A control process which is performed by the control circuit 80 for controlling the PWM duty and/or the rotational speed of the motor 30 will be described hereinafter by referring to FIGS. 9 and 10. Respective functions of the control circuit 80, which are shown in FIG. 2, are realized when the CPU included in the control circuit 80 performs the control process (a program and/or hard wiring) to be described hereinafter.

When the control circuit 80 is started up and the CPU starts the control process, in a step of S110, the control circuit 80 reads out various settings such as the mode currently set ("current mode" hereinafter). The current mode may be stored in a location of the memory device 92 without disturbing a (stored) registered mode that will be described later. For example, a variable called "registered mode" may be assigned a first location in the memory device 92, and a variable called "current mode" may be assigned a second location that is different from the first location.

In S120, then, based on an input signal from the main switch 10A, the control circuit 80 determines whether the trigger 10 is being pulled or manipulated (at or above a minimum/threshold pulling amount). If the control circuit 80 determines that the trigger 10 is being pulled, then in S130, a motor driving process for driving the motor 30 is performed.

During the motor driving process, in S131, the control circuit 80 obtains the pulling amount (manipulating amount) of the trigger 10 from the manipulating amount sensor 10B. In S132, based on the control characteristics read out in S110, the control circuit 80 performs various calculation processes for controlling the motor 30. The calculation processes may be table lookups.

In S133, based on calculation results of S132, the control circuit 80 decides the duty ratio (a command duty) of the PWM signal that is the control signal for driving the motor 30, as a function of the current mode.

In S134, then, the motor drive control device 94 as part of the control circuit 80 performs a PWM output process. Specifically, according to the PWM signal of the duty ratio decided in S133, the control circuit 80 turns on or off the respective switching devices Q1 to Q6 included in the drive circuit 52, and proceeds to S120.

In S120, on the other hand, if the control circuit 80 determines that the trigger 10 is not operated, then, the control circuit 80 sequentially confirms (identifies or determines) states of the mode-change switch 14, the hammering switch 22, and the special switch 26 in S140, S150, and S160 respectively.

In the confirmation processes of S140, S150, and S160, the control circuit 80 confirms (determines) an ON state or an OFF state of a respective or target switch and further may determine whether the respective switch is long-pushed or short-pushed based on a manipulation (pushing or ON) time of the switch. The switches may alternatively be normally ON switches, which turn OFF when manipulated or pushed.

Figure 11:
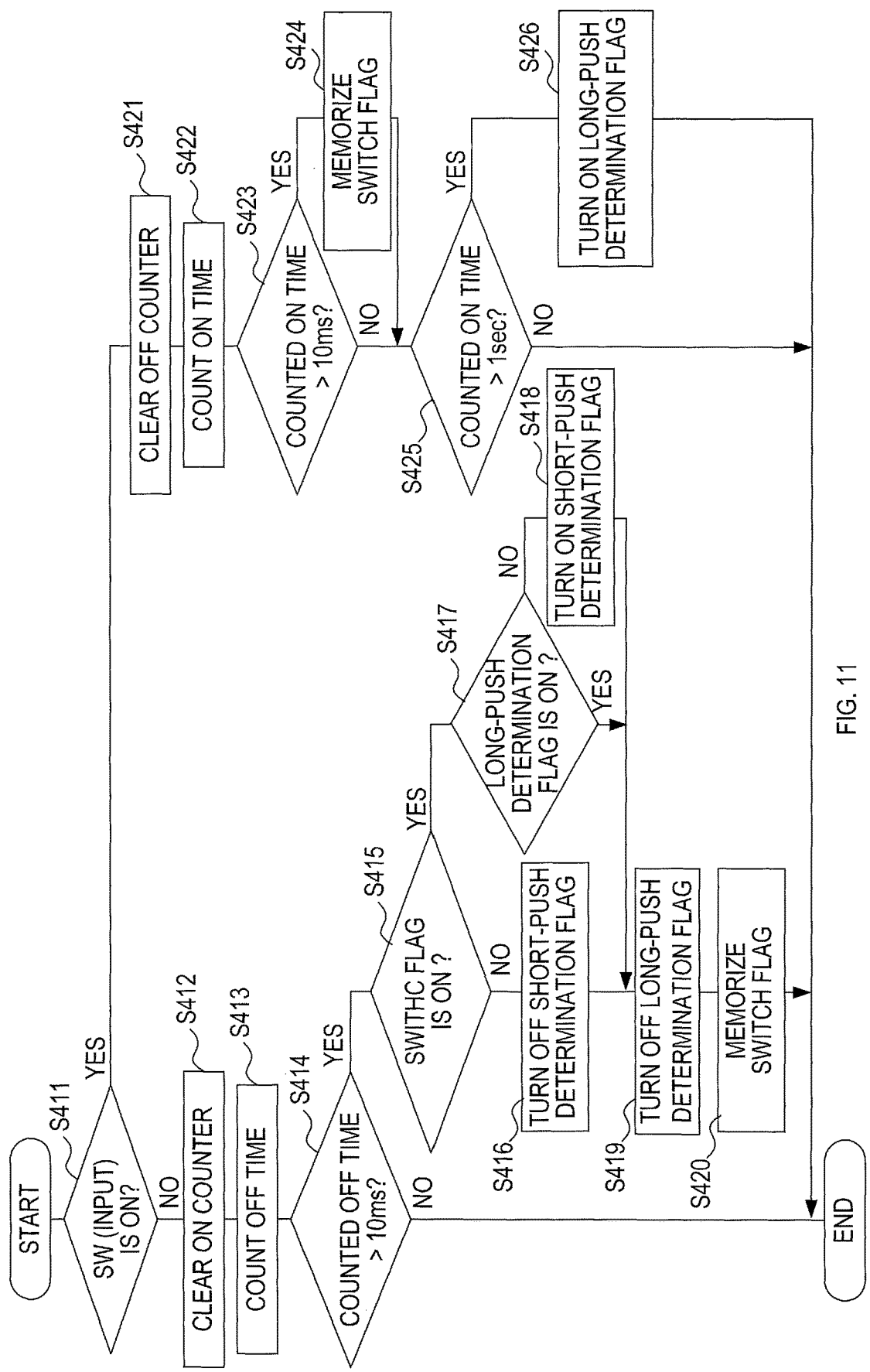
FIG. 11 is a flowchart showing a switch manipulation confirmation process.

The confirmation processes of S140, S150, and S160 are performed in a procedure shown in FIG. 11. The control circuit 80 includes an ON counter and an OFF counter.

In the confirmation processes of S140, S150, and S160, the control circuit 80 starts determining whether the target switch is in the ON state or the OFF state in S411. If the switch is in the OFF state, then in S412, the control circuit 80 clears the ON counter that counts an ON time.

In S413, the control circuit 80 counts an OFF time by incrementing the OFF counter. In S414, the control circuit 80 determines whether the counted time (OFF time) at the OFF counter exceeds a specified time (a short threshold time, for example, 10 ms). In S414, if the control circuit 80 determines that the counted time does not exceed the specified time (the short threshold time), then, the control circuit 80 ends the confirmation process. In S414, on the other hand, if a determination that the counted time exceeds the specified time (the short threshold time) is made, then, the control circuit 80 proceeds to S415.

In S415, the control circuit 80 determines whether a flag of the switch is ON at present, and if the control circuit 80 determines that such a flag is not ON at present, then in S416, the control circuit 80 turns off a short-push determination flag of the switch. Then in S419, the control circuit 80 turns off a long-push determination flag of the switch. Then in S420, the control circuit 80 determines and memorizes that the flag of the switch is OFF at present and ends the confirmation process. The flag of the switch, the short-push determination flag, and the long-push determination flag are initially OFF.

In S415, on the other hand, if the control circuit 80 determines that the flag of the switch is ON at present, then in S417, the control circuit 80 determines whether the long-push determination flag of the switch is ON. If a determination that the long-push determination flag is ON at present is made, then, the control circuit 80 proceeds to S419. In S417, if the control circuit 80 determines that the long-push determination flag is not ON at present, then in S418, the control circuit 80 turns on the short-push determination flag, and after that, proceeds to S419.

In S411, if the control circuit 80 determines that the switch is in the ON state, then in S421, the control circuit 80 clears the OFF counter that counts the OFF time. Then in S422, the control circuit 80 counts the ON time by incrementing the ON counter.

In S423, then, the control circuit 80 determines whether the counted time (ON time) at the ON counter exceeds a specified time (for example, 10 ms). If a determination that the counted time does not exceed the specified time (the short threshold time) is made, then, the control circuit 80 proceeds to S425. In S423, on the other hand, if a determination that the counted ON time exceeds the specified time is made, then in S424, the control circuit 80 turns on the flag of the switch and memorizes that the flag of the switch is ON at present. After that, the control circuit 80 proceeds to S425.

In S425, the control circuit 80 determines whether the ON time of the switch exceeds a set time (a long threshold time, for example, 1 sec) for the long-push determination. Then if the control circuit 80 determines that the ON time does not exceed the set time for the long-push determination, the control circuit 80 ends the confirmation process. If the control circuit 80 determines that the ON time exceeds the set time for the long-push determination, then, the control circuit 80 determines that the switch is long-pushed. And then in S426, the control circuit 80 turns on the long-push determination flag and ends the confirmation process.

To briefly summarize, in the confirmation process of S140, S150, and S160, when the target switch is operated and changes to the ON state, the ON time is counted and based on such a counted time, whether the switch is long-pushed is determined. Further, when the long push determination flag is not turned on and the switch changes to the OFF state, after a specified time passes with the switch in the OFF state, the short-pushed determination flag is set.

In such a manner, the states of the mode-change switch 14, the hammering switch 22, and the special switch 26 are confirmed in the confirmation process of S140, S150, and S160. Then in S170, the control circuit 80 determines whether the mode-change switch 14 is long-pushed.

Then, if the control circuit 80 determines that the mode-change switch 14 is long-pushed, then in S180, the control circuit 80 determines whether the hammering switch 22 is also long-pushed, and if the hammering switch 22 is also long-pushed, the control circuit 80 proceeds to S190.

In S190, the control circuit 80 memorizes (registers, stores) the mode currently set (that is, the current mode) as the registration mode (or a stored mode) in the memory device 92. The registration mode is the mode that can be changed by the manipulation of the mode-change switch 14. In S190, the (new) current mode (selected by the switches) is stored (set) as the (new) registration mode.

In other words, in the present embodiment, when the mode-change switch 14 and the hammering switch 22 are simultaneously long-pushed, the current mode is registered (stored) in the memory device 92 as the registration mode.

When the current mode is registered as the registration mode in the memory device 92 in such a manner, in S200, the control circuit 80 notifies that the registration mode is set or updated. Specifically, the control circuit 80 allows, for example, the indicator for displaying the current mode (e.g. a Low mode indicator or a Bolt mode indicator) and the setting indicator 46 in the operation panel 20 to flash while the mode-change switch 14 and the hammering switch 22 are being long-pushed.

Figure 10:
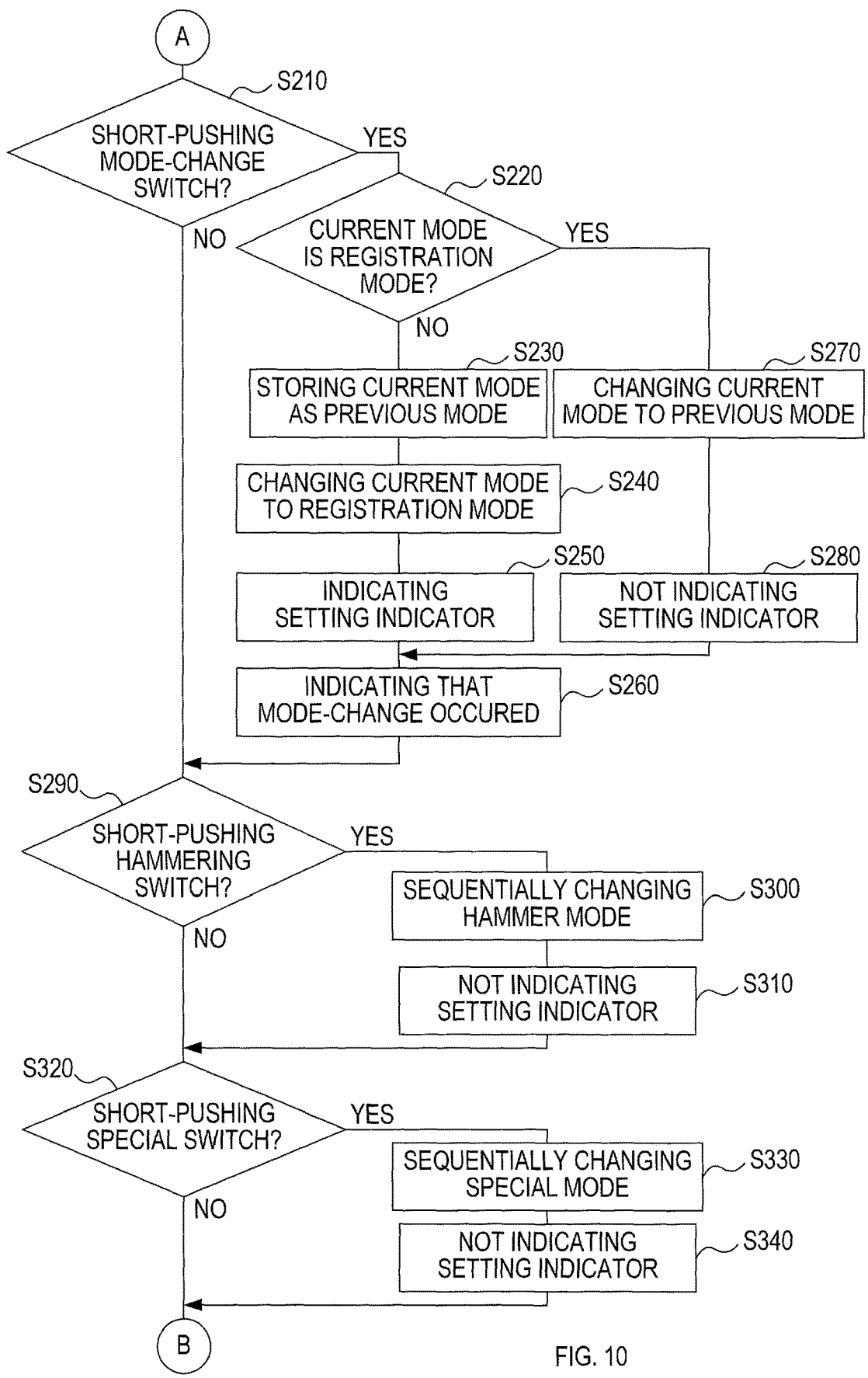
FIG. 10 is a flowchart showing a second half of the motor control process.

Then, when the control circuit 80 ends the notification made in S200, when the control circuit 80 determines that the mode-change switch 14 is not long-pushed in S170, or when the control circuit 80 determines that the hammering switch 22 is not long-pushed in S180, the control circuit 80 proceeds to S210 shown in FIG. 10.

In S210, the control circuit 80 determines whether the mode-change switch 14 is short-pushed. If a determination that the mode-change switch 14 is not short-pushed is made, then, the control circuit 80 proceeds to S290. If a determination that the mode-change switch 14 is short-pushed, then, the control circuit 80 proceeds to S220.

In S220, the control circuit 80 determines whether the current mode (the mode currently set for controlling the motor) is the registration mode. If the control circuit 80 determines that the current mode is not the registration mode, then in S230, the current mode (probably recently set with the hammering switch 22 or the special switch 26) is stored as a previous mode in the memory device 92, and the control circuit 80 proceeds to S240.

In S240, the registration mode is read out and used as the current mode such that the current mode and the registration mode are now the same. Then in S250, by lighting up the setting indicator 46 in the operation panel 20, the control circuit 80 notifies that the current mode is changed to the registration mode, and S260 indicates that a mode change occurred.

In S220, if the control circuit 80 determines that the current mode is the registration mode, then in S270, the control circuit 80 reads out the previous mode stored in the memory device 92, and uses the previous mode as the current mode for controlling the motor. In such a manner, whenever the mode-change switch 14 is short-pushed, the registration mode and the previous mode are set alternately as the current mode for controlling the motor.

Then in S280, by turning off the setting indicator 46, the control circuit 80 notifies that the current mode is not the registration mode changed by the manipulation of the mode-change switch 14, and proceeds to S260.

In S260, by flashing the LEDs of the lights 16 for a certain period of time, the control circuit 80 notifies that the mode is changed by the manipulation of the mode-change switch 14, and proceeds to S290. In other words, S260 indicates that a mode change occurred.

In S290 then, the control circuit 80 determines whether the hammering switch 22 is short-pushed. If the control circuit 80 determines that the hammering switch is not short-pushed, then in S320, the control circuit 80 determines whether the special switch 26 is short-pushed. If a determination that the special switch 26 is not short-pushed is made, then, the control circuit 80 proceeds to S120 shown in FIG. 9, and a series of the aforementioned steps of the processes are performed again.

In S290, if a determination that the hammering switch 22 is short-pushed is made, then, the control circuit 80 proceeds to S300. The four hammer modes are selectable/changeable sequentially by short-pushing the hammering switch 22. In S300, the control circuit 80 sequentially selects the next hammer mode to become the current mode.

Also in S300, the control circuit 80 memorizes the current mode (after the change) in the memory device 92. Further, the corresponding indicator is indicated. For example, the Low mode indicator is indicated.

In S310 then, by turning off the setting indicator 46, the control circuit 80 notifies that the current mode is not necessarily the registration mode.

In S320, if the control circuit 80 determines that the special switch 26 is short-pushed, then in S330, the control circuit 80 advances or cycles to the next special mode. The four special modes (Wood, Bolt, Tex (thin), and Tex (thick)) are selectable/changeable sequentially by short-pushing the special switch 26. In S330, the control circuit 80 sequentially selects the next special mode to become the current mode, and proceeds to S340.

Also in S330, like in S300, the control circuit 80 memorizes the current mode after the change in the memory device 92, and notifies the current mode in use by indicating the corresponding indicator. For example, the Bolt mode indicator is indicated.

Figure 9:
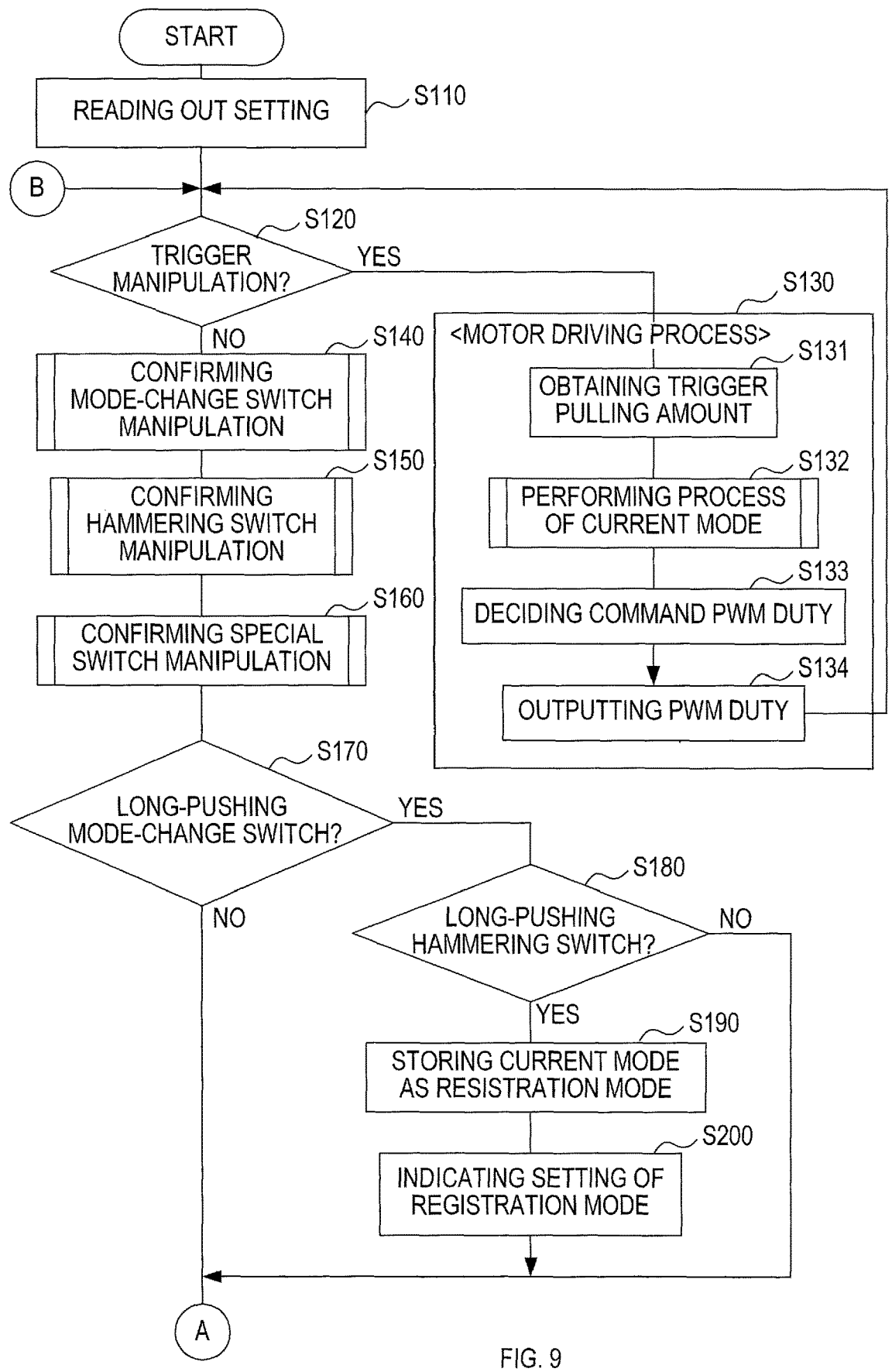
FIG. 9 is a flowchart showing a first half of a motor control process.

In S340 then, by turning off the setting indicator 46, the control circuit 80 notifies that the current mode is not necessarily the registration mode, and proceeds to S120 of FIG. 9.

As described so far, in the driver 1 of the present embodiment, the eight types of the modes (the control characteristics), which specify the control methods of the motor 30, are memorized in the memory device 92. And the user can select the mode out of the eight types of the modes by operating the hammering switch 22, the special switch 26, or the mode-change switch 14.

By operating the hammering switch 22 or the special switch 26, the user can change the mode to be set sequentially out of the four types, which corresponds to the respective switches, of the mode (the hammer mode or the special mode).

In contrast, with the mode-change switch 14, the mode that is settable therewith can be preliminarily registered. Further, each time the user operates the mode-change switch 14, it is possible for the user to change the mode for controlling the motor between the registration mode and the mode set with the hammering switch 22 or the special switch 26 alternately.

Accordingly, the user is allowed to change the mode very easily by preliminarily registering a desired mode as the registration mode, which can improve usability of the driver 1.

Among the aforementioned eight types of the modes, in the Bolt mode, while the motor 30 is allowed to be driven at the maximum rotational speed like in the Maximum mode, the pulling amount of the trigger 10 required to achieve the maximum rotational speed is set to be smaller than that in the Maximum mode.

Specifically, the control characteristics for the Bolt mode are set such that the duty ratio of the PWM signal becomes its maximum by the pulling amount of the trigger 10 with its pulling range set to 50% or less (approximately 40% in the present embodiment) of the effective manipulating range where the motor 30 is drivable. Thus, with such a pulling amount, the rotational speed of the motor 30 also becomes the maximum rotational speed.

As a result, when tightening or removing a bolt (or a nut), it is not necessary for the user to fully pull the trigger 10, which can improve operability of the driver 1.

Although the embodiment of the present disclosure have been described above, the present disclosure is not limited to the above-described embodiment, but may be practiced in various forms.

For example, in the aforementioned embodiment, the driver 1 has been described as one example of the electric working machine of the present disclosure. However, as far as the electric working machine of the present disclosure is configured to include a motor as a driving source and to control a rotational speed of such a motor in proportion to a manipulating amount of a manipulator such as a trigger or the like, similar to the aforementioned embodiment, such an electric working machine is applicable and the same effects can be brought about.

Also in the aforementioned embodiment, it has been described that the motor 30 is configured with the three-phase brushless motor. However, technologies of the present disclosure are applicable even when a driving source of the electric working machine is a motor with a brush or an alternate motor.

A plurality of functions performed by one element in the above-described embodiments may be performed by a plurality of elements, and one function performed by one element may be performed by a plurality of elements. A plurality of functions performed by a plurality of elements may be performed by one element, and one function performed by a plurality of elements may be performed by one element. Part of the configuration in the aforementioned embodiments may be omitted. At least part of the configuration in the aforementioned embodiments may be added to or replaced by the configuration in the aforementioned other embodiments. Any modes within the scope of the technical ideas identified from the claim language are embodiments of the present disclosure.

What is claimed is:

1. An electric working machine comprising:
   a motor;
   a manipulator for commanding driving of the motor, the manipulator being configured to be variably displaced in a manipulating range between a first off position and a second position;
   a setter configured to set predetermined first control characteristics that achieve a maximum rotational speed of the motor of the first control characteristics when the manipulator is displaced 50% or less of the manipulating range from the first off position toward the second position, where the motor is drivable; and
   a controller configured to control the driving of the motor in accordance with the first control characteristics set with the setter such that the greater a manipulating amount of the manipulator, the greater the rotational speed of the motor.

2. The electric working machine according to claim 1, wherein the setter is configured to set the first control characteristics in response to a bolt mode being set as a mode of the motor, and
   wherein the bolt mode is a mode for using the electric working machine to drive a bolt or a nut.

3. The electric working machine according to claim 2,
wherein the first control characteristics are set such that in the bolt mode, rotation of the motor is stopped or reduced in response to a decline in a load applied to the motor being rotated reversely so as to loosen tightening of the bolt or the nut.

4. The electric working machine according to claim 3,
wherein the controller is configured to sense a decline in a load applied to the motor from the rotational speed of the motor or a change in a current value flowing in the motor.

5. The electric working machine according to claim 2,
wherein the setter is further configured to set second control characteristics that are different from the first control characteristics,
wherein the setter is configured to set the second control characteristics in response to a screw-tightening mode being set as the mode of the motor, and
wherein the screw-tightening mode is a mode for using the electric working machine to drive a screw.

6. The electric working machine according to claim 5,
wherein the second control characteristics include a plurality of control characteristics whose maximum no-load rotational speeds of the motor are different from each other.

7. The electric working machine according to claim 1,
wherein the manipulator includes a trigger configured to be pulled by a user.

8. A method for controlling a motor of an electric working machine, the method comprising:

sensing a manipulating amount of a manipulator for commanding driving of the motor, the manipulator being configured to be variably displaced in a manipulating range between a first off position and a second position;

setting specified control characteristics that achieve a maximum rotational speed of the motor of the specified control characteristics when the manipulator is displaced 50% or less of the manipulating range from the first off position toward the second position, where the motor is drivable; and controlling the driving of the motor in accordance with the set specified control characteristics such that the greater the manipulating amount, the greater a rotational speed of the motor.

* * * * *